United States Patent [19] [11] 3,881,661
Powers et al. [45] May 6, 1975

[54] METHOD OF PREPARING AN ELECTROPHORETIC SUSPENSION OF BETA-ALUMINA PARTICLES

[75] Inventors: Robert W. Powers; Robert A. Giddings, both of Schenectady, N.Y.

[73] Assignee: General Electric Company, Schenectady, N.Y.

[22] Filed: Dec. 6, 1973

[21] Appl. No.: 422,435

[52] U.S. Cl. ................................. 241/15; 241/30
[51] Int. Cl. ............................................ B02c 19/12
[58] Field of Search ................... 241/15, 16, 21, 30

[56] References Cited
UNITED STATES PATENTS
2,385,313  9/1945  Thurber et al. .................. 241/21 X
3,358,937  12/1967  Pearson et al. ..................... 241/15

*Primary Examiner*—Granville Y. Custer, Jr.
*Attorney, Agent, or Firm*—Paul R. Webb, II; Joseph T. Cohen; Jerome C. Squillaro

[57] ABSTRACT

A method of preparing an electrophoretic suspension of beta-alumina particles includes vibromilling water free beta-alumina particles of a diameter larger than 20 microns in an organic fluid having a dielectric constant at 25 C of from 12 to 24 with zirconia grinding media. The resulting suspension is useful for forming beta-alumina articles by electrophoretic deposition.

3 Claims, No Drawings

METHOD OF PREPARING AN ELECTROPHORETIC SUSPENSION OF BETA-ALUMINA PARTICLES

The present invention relates generally to a method of preparing an electrophoretic suspension and, more particularly, is concerned with a method of preparing an electrophoretic suspension of beta-alumina particles.

Beta-alumina suspensions are suitable to produce beta-alumina articles which are useful as solid electrolytes in electrical energy storage devices in a variety of combinations of electrode materials useful over a broad range of operating temperature conditions. For example, a high-energy battery employs an anode of sodium and a cathode of sulfur in which both the sodium and sulfur are in the molten state at operating temperature and are in contact with and separated by an electrolyte of a thin, plate-like article or of a closed end tube of sodium beta-alumina. A high-energy battery can also employ in a similar structure an anode of the sodium type and a halogen cathode separated by the same type of sodium beta-alumina electrolyte. Kummer et al U.S. Pat. No. 3,404,036 describes the use of a plate-like article of sodium beta-alumina as the solid electrolyte in an energy conversion device. A closed end tube or casing of sodium beta-alumina as the solid electrolyte in a sodium-halogen battery is described in allowed copending patent application Ser. No. 228,082, filed Feb. 22, 1972, now U.S. Pat. No. 3,762,955 issued Oct. 2, 1973, for "Sealed Primary Sodium-Halogen Battery." This application is assigned to the same assignee as the present application.

In French Pat. Addition No. 95, 549, which as published on Jan. 22, 1971, there is a discussion of the principal U.S. Pat. No. 1,597,279, of Dec. 27, 1968. Both the principal patent and patent of addition deal with an improved procedure for making thin specimens of sinterable material, in particular ceramic material such as zirconia. Such specimens can be used as solid electrolytes in fuel cells operating at high temperature.

In the principal patent, such specimens are produced by preparing a homogeneous slurry in a solvent containing a binder. This slurry is then applied to a mandrel, covering it with a layer of uniform thickness which should be thicker than the desired final thickness. The covered mandrel is then isostatically pressed. After removing the mandrel, the specimen is sintered according to the principal French patent.

In the principal patent, a slurry has to contain such an amount of sinterable material and has to be of such viscosity, that one gets a layer of uniform thickness on the mandrel by simply dipping it into the slurry for a sufficient period of time. The slurry is made by suspending zirconia, stabilized by addition of yttrium oxide, in demineralized water containing some polyvinyl alcohol. The particle size of the zirconia should be smaller than 1 micron. This suspension is made in a ball mill. It has to be degassed before the dipping process can take place. After dipping, the mandrel covered by the paste-like layer is isostatically pressed. The mandrel is then removed and the pieces are sintered.

The sintering can consist of a first treatment in oxygen atmosphere at temperatures near 1,500°C. This treatment is followed by a second one at 2,000° or 2,100°C in vacuum or in an inert gas atmosphere. Finally, a third one is made again at 1,500°C in air atmosphere in order to reoxidize the product. As a result, one gets specimens which have a very homogeneous structure and are perfectly leak tight.

The dipping process is a very delicate operation especially if one wants to obtain a very uniform thickness without subsequent machining. The dipping process is still very time consuming, but compared with an earlier method of fabricating thin materials, which consisted of spraying a homogeneous slurry onto a heated mandrel, it is much quicker.

The patent of addition also relates to a procedure for fabricating specimens of sinterable material, in particular ceramic material. The material is first deposited onto a suitable mandrel. This is followed by an isostatic pressing process. Only then can one sinter the samples. The patent of addition discloses the use of electrophoretic deposition to form or shape the material to be sintered. The material is first suspended in a suitable liquid and the particles are given an electric charge. The material is then deposited onto a mandrel placed in this suspension. Deposition of material takes place on applying a potential difference between the mandrel and another electrode. For example, with zirconia, one has to suspend the particles in certain polar organic vehicles. One can use nitromethane as the vehicle to which one adds small amounts of benzoic acid. One can also use a mixture of acetone and ethyl alcohol containing small amounts of nitrocellulose. Once the deposition has been made the operations are continued as described in the principal patent mentioned above. The pieces are isostatically pressed and afterwards sintered.

The patent of addition describes that in order to electrically charge the zirconia particles, one suspends 20 g of zirconia with a grain size smaller than one micron (and which has been stabilized by addition of some yttrium oxide) in 100 g of nitromethane. This suspension is made within 15 minutes at room temperature in a ball mill. Afterwards one gram of benzoic acid is added to the suspension and one again ball mills for about 15 minutes. The suspension of the charged zirconia particles is then transferred to a stainless steel beaker. Constant stirring has to be applied during the deposition. This can be carried out with a magnetic stirrer. One can then deposit the particles onto a madrel. To do so, one dips the cylindrical, electrically conducting mandrel into the beaker. The mandrel is rotated. Then one applies a certain potential difference between the mandrel and the stainless steel beaker containing the suspension. This results in the deposition of zirconia particles on the mandrel. The potential difference can be, for example, between 30 to 500 V.

In order to get deposition of zircona particles onto the mandrel, one has to apply a potential difference of about 300 V between the mandrel and the beaker. A zirconia layer is deposited onto the mandrel when this potential difference is applied. The distance between the external surface of the mandrel and the internal wall of the beaker is about 2 cm. Under these conditions, in order to get a wall thickness of about 200 microns after isostatically pressing and sintering, one has to apply the necessary potential difference for about 5 seconds.

In the case of the zirconia particles suspended in nitromethane, the polarity of the charged particles is positive as inferred from the fact that the polarity of the mandrel has to be negative. On the other hand, when the zirconia particles are suspended in a solution containing one-third acetone and two-thirds ethly alcohol and containing one percent of nitrocellulose as an organic binder, the polarity of the particles is negative.

As stated in the principal patent, before isostatically pressing the samples, one can cover them with a protective layer which is applied to the outer face. All details given in the principal patent about the isostatic pressing and the sintering also apply to the patent of addition. Deposition by means of electrophoresis has the advantage that a wide variety of desired shapes of mandrels can be used. This allows one to obtain articles other than discs or tubes.

I understand that sodium beta-alumina can be formed in accordance with the above French patent addition. Further, in copending patent applications Ser. No. 400,047 filed Sept. 24, 1973, Ser. No. 400,046 filed Sept. 24, 1973, and Ser. No. 403,454 filed Oct. 4, 1973, and all entitled "Method of Making Beta-Alumina Articles," there are described and claimed methods which are improvements over the above French patent addition. These copending applications are assigned to the same assignee as the present application. My present application includes an improved milling method over the copending patent applications and over the above French patent and French patent addition. The present application is directed to an improved method of preparing an electrophoretic suspension of beta-alumina particles. Such particles can be formed electrophoretically into articles which are useful as solid electrolytes in various types of sodium batteries. My present application is an improvement over the above copending applications and the above French patent and French patent addition in providing the unique steps of vibromilling water free beta-alumina particles of a diameter larger than 20 microns in a particular organic fluid with a zirconia grinding media for a specific time period.

Both the above French patent and French patent addition describes suspending zirconia with a grain size smaller than one micron in nitromethane. A suspension is then prepared by employing a ball mill for 15 minutes. Benzoic acid is added to the suspension and it is ball milled again for about 15 minutes. The suspension of the charged zirconia particles is transferred to a stainless steel beaker for deposition. While both the subject French patent and the French patent addition employ particles with a grain size less than one micron in size, there is no description of any method for preparing particles in a grain size less than one micron in size as opposed to applicant's present invention. Further, as opposed to applicant's invention, there is described in these patents charging the zirconia particles by the addition of benzoic acid.

None of the above copending patent applications suggest, describe or teach applicant's present invention.

An article No 11 entitled "Production of $\beta$-$Al_2O_3$ Electrolyte" appeared by Wynn Jones and L. J. Miles in Proceedings of the British Ceramic Society, No. 19, 1970, pages 161–178. Beta-alumina electrolyte has been prepared, according to the article, in the form of long thin tubes by isostatic pressure molding of a mixture of alpha-alumina and sodium aluminate followed by reactive sintering between 1,600° and 1,900° C in an inductively heated furnace thereby converting the material to beta-alumina. A five minute firing time is used by moving the pressed tube through a 2.5 inch hot zone at 0.5 inch per minute. On page 164 of this article, it is described that the alpha-alumina and sodium aluminate are dry milled by vibromilling with alumina cylinders for periods of up to 48 hours to achieve grinding and homogenization. The particles were isostatically molded at pressure of 30,000 lb-f/in$^2$.

As opposed to applicant's invention, this article describes vibromilling alpha-alumina and sodium aluminate in the absence of a vehicle with alumina cylinders for periods up to 48 hours. The particles are then isostatically pressed and reactively sintered.

The primary object of our invention is to provide an improved method of preparing an electrophoretic suspension of beta-alumina particles.

In accordance with one aspect of our invention, a method of preparing an electrophoretic suspension of beta-alumina particles includes vibromilling water free beta-alumina particles of a diameter larger than 20 microns in an organic fluid having a dielectric constant at 25° C of from 12 to 24 with zirconia grinding media.

These and various other objects, features and advantages of the invention will be better understood from the following description.

Our preferred method of preparing an electrophoretic suspension of beta-alumina particles can be employed in any of the above copending applications Ser. No. 400,046 or Ser. No. 403,454 to form beta-alumina articles. The following description is provided of the methods in these copending patent applications.

In providing a simplified but improved process in copending application Ser. No. 400,047 a selection was commenced for a suitable vehicle for the dispersion of the beta-alumina particles which was most important since this selection determined whether a deposit was obtained or not and to some extent the viscous qualities of the deposit. It was found that electrophoretic deposits were obtained only from vehicles with dielectric constants in the range from about 12 to 24. Following initial experiments in Ser. No. 400,047 with a large number of vehicles and mixtures of vehicles, nearly all subsequent work was carried out with a preferred vehicle n-amyl alcohol (1-pentanol). Its dielectric constant is 13.9. With it, neither the formation of anodic films on the mandrels nor that of fluid deposits was observed.

The following is a preferred milling process which was described in the above copending applications. A friable powder was used such as Alcoa XB-2 beta-alumina, a commercial product of Alcoa Company, New York, N.Y. Milling was carried out at a high powder concentration, e.g., 200 grams per 200 ml n-amyl alcohol vehicle. The suspension was milled in a clean polyethylene jar. Zirconia was used in preference to alpha-alumina media. If slight contamination by zirconia is intolerable, a 91% alumina media is employed.

An electrophoretic deposition apparatus for carrying out the above invention of the copending applications comprised a stainless steel vessel filled with a suspension. This vessel functioned also as the counter electrode. In copending application Ser. No. 400,047 the suspension included milled beta-alumina particles and the n-amyl alcohol vehicle. In copending application RD-5610 a small amount of aluminum tristearate was added at concentrations of approximately 0.1 to 1.0 percent by weight of the beta-alumina. In copending application Ser. No. 403,454 either of the above suspensions from copending application Ser. No. 400,047 or 400,046 was employed. This suspension was transferred from the polyethylene jar after the grinding or milling has been accomplished. Beta-alumina articles were formed from the suspension by electrophoretic deposition and are subsequently sintered.

We found that we can provide an improved method of preparing an electrophoretic suspension of beta-alumina particles. Such a suspension can be employed to produce electrophoretically deposited beta-alumina articles. We employ an organic fluid vehicle having a dielectric constant at 25° C of from 12 to 24. Of such organic fluid vehicles, the preferred vehicle is n-amyl alcohol having a dielectric constant of 13.9.

The milling or grinding of beta-alumina/n-amyl alcohol suspensions is carried out for two very different purposes: to develop a suitable charge on the particle surfaces and secondly to facilitate production of dense ware during sintering by use of suitably small particle sizes with a diameter of from 1 to 2 microns. Beta-alumina powders are charged positively when first placed in an organic fluid vehicle, such as n-amyl alcohol, presumably as a result of water adsorption from the atmosphere. The absorption of protons or conceivably other cations giving rise to positively charged particles is another charging mode for beta-alumina particles and has been used in the French process described above. Water is a troublesome impurity. The vehicle must be free of water. The powder must be water free. Alcoa XB-2 beta-alumina, is a commercial powder product of Alcoa Company, New York, New York which we found cannot be used until dried further to be water free prior to employment in the vehicle. While various drying approaches can be employed, the necessary drying of this material can be accomplished by heating the beta-alumina up to 1,400° C in an air or oxygen atmosphere for a period of about 24 hours. The diameter of the initial beta-alumina powder is larger than 20 microns. Dry grinding of material to particle size larger than 20 microns does not have harmful effects. Beta-alumina materials containing various amounts of soda can be employed in our process. Beta-aluminas from different sources have been used. Alcoa XB-2 beta-alumina is the preferred material. Additives, of the order of a weight percent, were often added to the beta-alumina powder. These included, for example, magnesia from basic magnesium carbonate and yttria. Appropriate quantities of the additives in powder form were mixed thoroughly with the beta-alumina powder by tumble mixing for 24 to 48 hours. The resulting mixture of powders was calcined in an oxygen atmosphere for 24 hours at 1,400° C. This calcination provides also the above-mentioned drying for the Alcoa XB-2 powder. Such calcined material served as the starting powder for the deposition work.

As described in the above copending applications, reduction in size of the starting powder and electrical charging of the particles were carried out simultaneously by milling under the vehicle, i.e., the organic liquid in which the beta-alumina particles are suspended during deposition. Various kinds of milling were examined in the course of this work.

Milling was carried out in 32 oz wide-mouth polyethylene bottles in the above copending applications and in the present application. Their use as mill jars reduces contamination since any abraded material is burned out during sintering. These containers were half-filled with grinding media, either 1,100 grams of alumina media or 1,800 grams of zirconia. When suspensions were ball-milled the volume of the vehicle was 200 ml. The amount of starting powder in the charge ranged from 30 to 200 grams.

During milling the positive charge is first neutralized and subsequently a negative charge develops after 2 to 8 hours, depending on the powder, grinding media, and the method of milling. It is assumed that, during milling, fresh beta-alumina surfaces are produced by fracture beneath the n-amyl alcohol where contamination by water is unlikely. Unlike the sintering behavior, charge on the particles is not affected for times greatly in excess of that required to develop a negative charge. The milling problem involved the need to develop a method to produce an adequately small particle size without incurring appreciable wear of the grinding media. Both alpha-alumina and zirconia were initially employed separately as grinding media to find an improved method of milling.

We found that we can provide an improved method of preparing an electrophoretic suspension of beta-alumina particles. As described above in this application, beta-alumina was provided initially with particles of a diameter larger than 20 microns as the starting material. Secondly, we found that the material must be free of water or dry to be utilized in our method. Thirdly, we found that the particles must be added to an organic fluid vehicle having a dielectric constant at 25° C of from 12 to 24. Of such vehicles, n-amyl alcohol is the preferred vehicle with a dielectric constant of 13.9. The milling must be accomplished in the vehicle to produce a nagative charge on the particles and to result in a final particle size wherein a majority of the particles have a diameter in the range of from 1 to 2 microns. A density of at least 3.17 g/cc is required for the final article which corresponds to a particle size diameter of from 1 to 2 microns and to only 2 percent porosity.

We ball-milled successfully to produce the above type of suspension with beta-alumina particle size diameter of from 1 to 2 microns in n-amyl alcohol by using zirconia cylinders with 1 centimeter diameter. The time required was about 63.5 hours. 1.4 percent wear of the grinding media occurred based on the amount of beta-alumina present. A sintered article made from the suspension showed a density of 3.175 g/cc.

We found unexpectedly that we could vibromill the water free beta-alumina particles in n-amyl alcohol by using zirconia cylinders resulting in a suspension producing an article with the required properties within a substantially reduced time period of from only 9 to 18 hours. After we ball-milled successfully the above-described suspension, we tried to reduce the 63.5 hour time period required to accomplish the milling in a lesser period to provide an improved method which could be accomplished within a reasonable time limit. We substituted 91% alumina balls for the zirconia cylinders and ball-milled under similar conditions for 12 to 16 hours, respectively. We found however that we attained a density of only 3.087 g/cc for the 12 hour ball-milling while we attained a density of only 3.000 g/cc for the 16 hour ball-milling. Both of these densities were below the required density. Secondly, the percentage wear of the grinding media was 2.0 for the 12 hour ball-milling and 2.8 for the 16 hour ball-milling.

Examples of preparing ball-milled suspensions of beta-alumina and beta-alumina articles not made in accordance with the method of our invention are as follows:

EXAMPLES I–IV

Four separate suspensions were prepared as Examples I–IV. A closed end tube was formed from each of the suspensions. The first and second suspensions, Examples I and II, each contained 200 grams of modified Alcoa XB-2 beta-alumina particles with a particle diameter greater than 20 microns. The powder used in Examples I and II as well as the powders used in the other Examples were modified by the initial addition of 1.0% magnesia and 0.5% yttria. In Example I, the beta-alumina powder was added to and ball-milled in 200 ml. of n-amyl alcohol. In Example II, the beta-alumina powder and 0.25 gram of aluminum stearate were added to and ball-milled in 200 ml. of n-amyl alcohol. After ball-milling, the suspension was diluted with an additional 200 ml. of n-amyl alcohol. The third suspension, Example III, contained 110 grams of modified Monofrax H beta-alumina powder and 0.138 grams of aluminum stearate in 200 ml. of n-amyl alcohol. The Monofrax H beta-alumina is a commercial product of Carborundum Company, Falconer, New York, which commercial material is a fused product usually available in the form of bricks. The Monofrax H beta-alumina bricks wer jaw-crushed, ball-milled dry with alpha-alumina balls, and then screened to provide the powder with a diameter range of 44 to 105 microns. The fourth suspension, Example IV, contained 100 grams of modified Alcoa XB-2 and 0.125 grams aluminum stearate in 200 ml of n-amyl alcohol. The suspensions I and II were ball-milled with 1,800 grams of zirconia cylinders having dimensions of one-half inch by one-half inch. Suspensions III and IV were ball-milled with 1,100 grams of 91% alumina balls having a diameter of 1 cm. Table 1 sets forth below the example number, the ball-milling time in hours, the fired density of an article formed from the suspension, and the wear of the grinding media expressed as a percent of the beta-alumina present in the suspension.

TABLE 1

| Example No. | Milling Time-Hrs. | Fired Density | % Wear of Media |
| --- | --- | --- | --- |
| I | 63.5 | 3.175 | 1.4 |
| II | 63.5 | 3.178 | 1.4 |
| III | 16.0 | 3.000 | 2.8 |
| IV | 12.0 | 3.087 | 2.0 |

After each of the above suspensions was prepared the suspension was transferred from its polyethylene jar to a separate stainless steel vessel. A stainless steel mandrel with an exposed surface portion haing a length of 4.5 inches was inserted in the stainless steel vessel as a positive electrode while the vessel served as the negative electrode. A DC electric field or 1,980 volts per centimeter was applied initially from a conventional power source across the mandrel and the vessel. After about 40 seconds a closed end beta-alumina tube was deposited on the mandrel. After each of the above depositions each closed end tube was air dried for 24 hours on its respective mandrel. Each closed end tube was then removed from its mandrel and sintered in an oxygen atmosphere at 1,800° C for a period of 5 minutes. The density of each of the resulting closed end beta-alumina tubes was determined which appears above in Table 1. It will be noted that the suspensions of Examples I and II which required 63.5 hours of ball-milling resulted in articles which had the required density of at least 3.17. Articles produced from the suspensions of Examples II and IV did not provide the required densities.

Examples of forming beta-alumina suspensions by vibromilling with 91% alumina balls not in accordance with out method are as follows:

EXAMPLES V–VII

We employed 91% alumina balls as the grinding media but vibromilled the beta-alumina particles with 1,100 grams of the alumina balls. The vibromilling was carried out with a commercial Sweco model M18L55 vibro-energy mill. The mill jars were shaken 1,200 times per minute in an upright position in this machine. The suspension for each of these Examples V–VII was the same as for Example II above. We vibromilled the beta-alumina for respective periods of 24, 48 and 72 hours. We found that we were able to obtain the desired density of 3.17 g/cc within each of these time periods. At 24 hours an acceptable 1.3 percentage of grinding media wear occurred. However, at 48 hours the percentage wear was 2.9. At 72 hours it had increased to 4.6. Both of the latter percentage weat were unacceptable. Table 2 below sets forth the example number, the vibro-milling time in hours, the fired density of an article formed from the suspension, and the percent wear of the grinding media.

TABLE 2

| Example No. | Milling Time-Hrs. | Fired Density-g/cc | % Wear of Media |
| --- | --- | --- | --- |
| V | 24 | 3.184 | 1.3 |
| VI | 48 | 3.226 | 2.9 |
| VII | 48 | 3.236 | 4.6 |

A closed end tube was formed from each of the above suspensions as described above in Examples I–IV. The fired density of each of the resulting closed end beta-alumina tubes was determined which appears above in Table 2.

Examples of forming beta-alumina suspensions by vibromilling with zirconia in accordance with our method are as follows:

EXAMPLES VIII–XI

We found that we could vibromill the water free beta-alumina particles by using zirconia within a substantially shorter period of 9 to 18 hours as opposed to ball-milling with zirconia for a period of 63.5 hours or to vibromilling with alumina for a minimum period of 24 hours. However, initially we were unsuccessful when we employed a time period of 6 hours although the percent wear of grinding media was very small at 0.6. The density was below the required density of 3.17 g/cc. We then tried time periods of 9, 14 and 18 hours, all of which resulted in obtaining subsequent desirable densities for the formed article and quite acceptable percnet wear of the grinding media. The 9 hour vibromilling provided us with a quite desirable suspension with the shortest time period. However, at 18 hours we had a very desirable improved method providing us with almost theoretical density of the material and the percentage wear of the grinding media was only 1.2.

The wear of the last grinding media was also slightly below the grinding media used in ball-milling of 63.5 hours.

The suspension for Examples VIII, X and XI consisted of 150 grams of modified Alcoa XB-2 beta-alumina powder in 300 ml. of n-amyl alcohol. The suspension for Example IX was the same as for Examples II, V, VI and VII. We vibromilled as in the same manner as for above Examples V–VIII but for periods of 9, 14 and 18 hours using zirconia cylinders each of which was one-half inch by one-half inch. 1,800 grams of zirconia cylinders were used with each suspension. Table 3 sets forth below the example number, the vibromilling time in hours, the fired density of an article fabricated from the suspension, and the percent wear of the grinding media.

TABLE 3

| Example No. | Milling Time-Hrs. | Fired Density-g/cc | % Wear of Media |
| --- | --- | --- | --- |
| VIII | 9 | 3.183 | 0.8 |
| IX | 14 | 3.199 | 0.4 |
| X | 14 | 3.212 | 1.0 |
| XI | 18 | 3.252 | 1.6 |

A closed end tube was formed from each of the above suspensions as described above in Examples I–IV. The fired density of each of the resulting closed end beta-alumina tubes was determined which appears above in Table 3.

While other modifications of the invention and variations thereof which may be employed within the scope of the invention have not been described, the invention is intended to include such as may be embraced within the following claims:

What we claim as new and desire to secure by Letters Patent of the United States is:

1. A method of preparing an electrophoretic suspension of beta-alumina particles comprises providing water free beta-alumina particles of a diameter larger than 20 microns, adding the particles to an organic fluid vehicle having a dielectric constant at 25° C of from 12 to 24, adding zirconia grinding media, vibromilling the beta-alumina particles for a period of 2 hours to develop a negative charge on the particles, continuing the vibromilling for an additional period of from 7 to 16 hours thereby reducing the particle size wherein a majority of the particles have a diameter in the range of from 1 to 2 microns and thereby providing a suspension of the beta-alumina particles in the organic fluid, and removing the suspension from the grinding media.

2. A method as in claim 1, in which the organic fluid vehicle is n-amyl alcohol having a dielectric constant of 13.9.

3. A method as in claim 1, in which 0.5 to 5.0 percent aluminum stearate by weight of the beta-alumina particles is added initially to the organic fluid vehicle.

* * * * *